United States Patent
Zhang et al.

(10) Patent No.: US 9,899,659 B2
(45) Date of Patent: Feb. 20, 2018

(54) METHOD OF PREPARING ANODE OF LITHIUM ION BATTERIES OR ELECTRODE PLATE OF SUPERCAPACITOR

(71) Applicant: Guangzhou Institute of Energy Conversion, Chinese Academy of Sciences, Guangzhou (CN)

(72) Inventors: Lingzhi Zhang, Guangzhou (CN); Haoxiang Zhong, Guangzhou (CN); Daoping Tang, Guangzhou (CN)

(73) Assignee: SHENZHEN XIN CHANG LONG NEW MATERIALS TECHNOLOGY CO., LTD., Shenzhen (CN)

(*) Notice: Subject to any disclaimer, the term of this patent is extended or adjusted under 35 U.S.C. 154(b) by 217 days.

(21) Appl. No.: 14/843,965

(22) Filed: Sep. 2, 2015

(65) Prior Publication Data
US 2015/0380719 A1    Dec. 31, 2015

Related U.S. Application Data

(63) Continuation-in-part of application No. PCT/CN2014/095677, filed on Dec. 30, 2014.

(30) Foreign Application Priority Data

May 27, 2014 (CN) .......................... 2014 1 0229082

(51) Int. Cl.

| | |
|---|---|
| H01M 4/04 | (2006.01) |
| H01M 4/1391 | (2010.01) |
| H01M 4/1393 | (2010.01) |
| H01M 4/1395 | (2010.01) |
| H01M 4/38 | (2006.01) |
| H01M 4/485 | (2010.01) |
| H01M 4/587 | (2010.01) |
| H01M 4/62 | (2006.01) |
| H01M 10/0525 | (2010.01) |
| H01G 11/30 | (2013.01) |
| H01G 11/34 | (2013.01) |
| H01G 11/38 | (2013.01) |
| H01G 11/50 | (2013.01) |
| H01G 11/86 | (2013.01) |
| C09J 145/00 | (2006.01) |
| C09J 147/00 | (2006.01) |
| C09J 101/28 | (2006.01) |
| C09J 105/00 | (2006.01) |
| C09J 105/08 | (2006.01) |
| C09J 189/06 | (2006.01) |
| H01M 4/02 | (2006.01) |

(52) U.S. Cl.
CPC ....... *H01M 4/0402* (2013.01); *C09J 101/286* (2013.01); *C09J 105/00* (2013.01); *C09J 105/08* (2013.01); *C09J 145/00* (2013.01); *C09J 147/00* (2013.01); *C09J 189/06* (2013.01); *H01G 11/30* (2013.01); *H01G 11/34* (2013.01); *H01G 11/38* (2013.01); *H01G 11/50* (2013.01); *H01G 11/86* (2013.01); *H01M 4/0404* (2013.01); *H01M 4/1391* (2013.01); *H01M 4/1393* (2013.01); *H01M 4/1395* (2013.01); *H01M 4/386* (2013.01); *H01M 4/485* (2013.01); *H01M 4/587* (2013.01); *H01M 4/622* (2013.01); *H01M 4/625* (2013.01); *H01M 10/0525* (2013.01); *C08L 2201/54* (2013.01); *H01M 2004/027* (2013.01)

(58) Field of Classification Search
CPC ............ H01M 4/0402; H01M 4/0404; H01M 4/1391; H01M 4/1393; H01M 4/1395; H01M 4/386; H01M 4/485; H01M 4/587; H01M 4/622; H01M 4/625; H01M 10/0525; H01M 2004/027; H01G 11/30; H01G 11/34; H01G 11/38; H01G 11/50; H01G 11/86
See application file for complete search history.

(56) References Cited

U.S. PATENT DOCUMENTS

2003/0148179 A1    8/2003    Uyama et al.

FOREIGN PATENT DOCUMENTS

| CN | 101475783 A | * | 7/2009 |
|---|---|---|---|
| CN | 102786894 A | | 11/2012 |
| CN | 103361017 A | | 10/2013 |
| CN | 103396500 A | | 11/2013 |
| CN | 103426496 A | | 12/2013 |
| JP | 56125431 A | * | 10/1981 |
| JP | 58132063 A | * | 8/1983 |
| JP | 4-220478 A | | 8/1992 |
| WO | 2005067081 A1 | | 7/2005 |

OTHER PUBLICATIONS

J.-S. Bridel et al., Key parameters governing the reversibility of Si/Carbon/CMC electrodes for Li-ion batteries, Chemistry of Materials, 2010, pp. 1229-1241, vol. 22, No. 3, American Chemical Society, United States.

* cited by examiner

*Primary Examiner* — Gregg Cantelmo
(74) *Attorney, Agent, or Firm* — Matthias Scholl P.C.; Matthias Scholl

(57) ABSTRACT

A method of preparing an anode of lithium ion batteries or an electrode plate of a supercapacitor. The method includes admixing a terpene resin-based aqueous binder. The terpene resin-based aqueous binder includes a terpene resin emulsion including between 20 and 80 wt. % of a terpene resin, and the terpene resin emulsion has a viscosity of between 2000 and 10000 mPa·s.

6 Claims, 4 Drawing Sheets

METHOD OF PREPARING ANODE OF LITHIUM ION BATTERIES OR ELECTRODE PLATE OF SUPERCAPACITOR

CROSS-REFERENCE TO RELATED APPLICATIONS

This application is a continuation-in-part of International Patent Application No. PCT/CN2014/095677 with an international filing date of Dec. 30, 2014, designating the United States, now pending, and further claims priority benefits to Chinese Patent Application No. 201410229082.7 filed May 27, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a terpene resin-based aqueous binder, and a method of using the same for preparing an anode for lithium ion batteries or a supercapacitor.

Description of the Related Art

The manufacturing process of a battery or a supercapacitor requires a binder to bond the electrode active material. Conventional organic binders, e. g., polyvinylidene fluoride (PVDF), tend to absorb the electrolyte and swell, thereby reducing the bond performance of the binders, and the volume of active particles often changes during charging and discharging. In addition, PVDF is generally dissolved in N-methyl-2-pyrrolidone (NMP), which is volatile, flammable and explosive, thereby posing serious pollution problems.

Water-based binders are inexpensive and environment friendly, and thus potentially useful for developing binders for lithium ion batteries. For example, carboxymethyl cellulose (CMC)/styrene-butadiene rubber (SBR) is a common water-based binder used in lithium ion batteries. However, when CMC/SBR is used in the graphite anodes, the impedance of the solid electrolyte interface is large, which is unfavorable to the extraction of the lithium ions and adversely affects the long-term cycle performance and high-rate charge-discharge performance of batteries.

Terpene resin, molecular weight of about 650-1200, is made from natural turpentine, has excellent thermal stability, good aging resistance, good compatibility with styrene-isoprene-styrene (SIS), styrene-butadiene-styrene (SBS), ethylene vinyl acetate (EVA) and natural rubber. It can be used in the field of rubber, adhesive, pressure-sensitive adhesive, hot-melt coatings, paints, packing, antirust oil, chewing gum, etc.

SUMMARY OF THE INVENTION

In view of the above-described problems, it is one objective of the invention to provide a terpene resin-based aqueous binder and use thereof for preparing an anode of lithium ion batteries or an electrode plate of a supercapacitor, and a preparation method of the anode of lithium ion batteries or the electrode plate of a supercapacitor.

To achieve the above objective, in accordance with one embodiment of the invention, there is provided a terpene resin-based aqueous binder, comprising a terpene resin emulsion and an additive. The terpene resin-based aqueous binder is used for preparation of an anode of lithium ion batteries or an electrode plate of a supercapacitor. The terpene resin-based aqueous binder is synthesized by the emulsification of terpene resin and a high molecular surfactant. The terpene resin is available in the market.

In a class of this embodiment, a mass ratio of the terpene resin to the additive is between 100: 0 and 1: 100. The additive is selected from the group consisting of carboxylated cellulose or a salt thereof, polyacrylic acid or a salt thereof, alginic acid or a salt thereof, water soluble chitosan derivatives, gelatin, xanthan gum, gum Arabic, pectin, polyvinyl alcohol, polyethylene glycol, polyvinylpyrrolidone, and styrene-butadiene rubber latex.

In a class of this embodiment, the terpene resin emulsion comprises between 20 and 80 wt. % of terpene resin, and the terpene resin emulsion has a viscosity of between 2000 and 10000 mPa·s.

In a class of this embodiment, the terpene resin-based aqueous binder is particularly suitable for preparation of an anode of lithium ion batteries or an electrode plate of a supercapacitor, for example, graphite, activated carbon, silicon, and lithium titanate.

The invention also provides a method of preparing an anode of lithium ion batteries or an electrode plate of a supercapacitor comprising admixing the terpene resin-based aqueous binder.

The invention further provides an anode of lithium ion batteries or an electrode plate of a supercapacitor, comprising the terpene resin-based aqueous binder, an active material, a conductive agent, the terpene resin-based aqueous binder further comprising an additive, and a mass ratio of the active material to the conductive agent to a total mass of the terpene resin and the additive being between 70 and 95:between 1 and 20:between 4 and 10.

In a class of this embodiment, the active material is graphite, activated carbon, silicon, or lithium titanate, and the conductive agent is a carboneous conducting material selected from the group consisting of acetylene black, super P, vapor-grown carbon fiber (VGCF), carbonnanotubes (CNTs).

A method of preparing an anode of lithium ion batteries or an electrode plate of a supercapacitor comprises:

1) uniformly mixing, stirring and dispersing the active material and the conductive agent to yield a first mixture;

2) adding the additive to deionized water to yield an aqueous solution, and adding the aqueous solution to the first mixture obtained in 1) and uniformly stirring, to yield a second mixture;

3) adding the terpene resin emulsion to the second mixture obtained in 2), followed by addition of appropriate deionized water and uniformly stirring, to yield an electrode slurry; and 4) coating the electrode slurry obtained in 3) on a Cu foil or an Al foil, fully drying, to yield the anode of lithium ion batteries or the electrode plate of a supercapacitor.

In a class of this embodiment, a solid content of the electrode slurry obtained in 3) is between 30 and 45%, and a viscosity thereof is between 2500 and 4000 mPa·s.

In a class of this embodiment, the coated Cu foil or Al foil is dried under vacuum for between 24 and 48 hours at a constant temperature of between 80 and 90° C.

The method of preparing an anode of lithium ion batteries or an electrode plate of a supercapacitor employs deionized water as a solvent to prepare the slurry, and the solid content thereof is 30-45%. And the membrane drying temperature is between 80 and 90° C.

The invention still provides a lithium ion battery or a supercapacitor comprising the anode of lithium ion batteries or an electrode plate of a supercapacitor.

In a class of this embodiment, the lithium ion battery or supercapacitor comprises a battery case, an electrode core, and an electrolyte. The electrode core and electrolyte are sealed in the battery case. The electrode core comprises the electrode and a separator disposed therebetween. The electrode comprises the terpene resin-based aqueous binder.

Advantages of the terpene resin-based aqueous binder according to embodiments of the invention are summarized as follows.

1) The anode of lithium ion batteries or the electrode plate of a supercapacitor comprising the terpene resin-based aqueous binder has relatively low interface impedance.

2) The application of the terpene resin-based aqueous binder to the anode of lithium ion batteries or the electrode plate of a supercapacitor can significantly improve the high-rate charge-discharge performance and the cycle stability of batteries.

3) The raw material of the terpene resin in the invention is widely found in natural plants, so the production cost of the batteries is greatly reduced.

DETAILED DESCRIPTION OF THE EMBODIMENTS

For further illustrating the invention, experiments detailing a terpene resin-based aqueous binder and methods of preparing and using the same are described below. It should be noted that the following examples are intended to describe and not to limit the invention.

A method of preparing an anode of lithium ion batteries or an electrode plate of a supercapacitor, comprises:

1) uniformly mixing, stirring and dispersing an active material and a conductive agent to yield a first mixture;

2) adding an additive to deionized water to yield an aqueous solution, and adding the aqueous solution to the first mixture obtained in 1) and uniformly stirring, to yield a second mixture;

3) adding terpene resin emulsion to the second mixture obtained in 2), followed by addition of appropriate deionized water and uniformly stirring, to yield an electrode slurry;

4) coating the electrode slurry obtained in 3) on a Cu foil or an Al foil, fully drying, to yield the anode of lithium ion batteries or the electrode plate of a supercapacitor; and 5) cutting and weighing the electrode plate, and employing the obtained electrode plate to prepare a battery.

The terpene resin emulsion involved in the following examples is purchased from Guangzhou Songbao Chemical Co., LTD, and the specific type is water-based terpene resin tackifying emulsion No. 8218. In the examples, TX is an abbreviation of terpene resin.

The peeling strength of TX and PVDF films is measured as follows.

The terpene resin emulsion was coated on an Al foil and fully dried under vacuum at 120° C. for 24 h, to yield a homogeneous film. PVDF film was prepared in the similar way, except that it was dissolved in NMP. The polymer films were respectively attached to 3 M adhesive tape, and the peel strength of the sample was measured with a high-precision micromechanical test system (Delaminator Adhesion Test System; Shenzhen Kaiqiangli, KQL, China). The adhesive tape was removed by peeling at an angle of 180° at a constant displacement rate of 50 mm/min.

Results and Analysis

Figure 8:
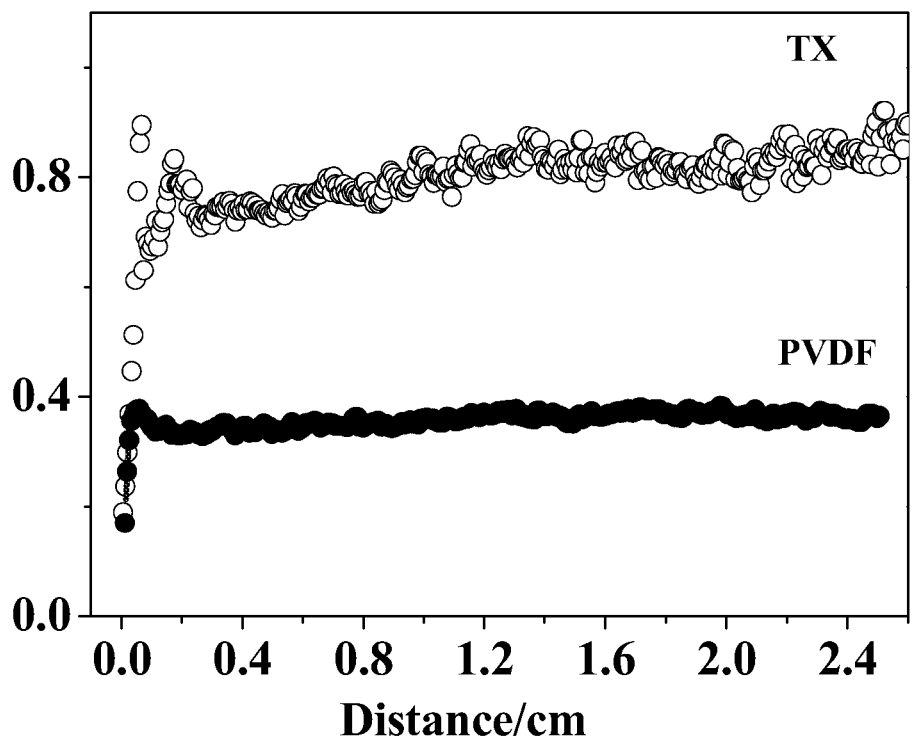
FIG. 8 shows the peeling strength of TX and PVDF films.

FIG. 8 shows the peel strength of TX and PVDF films. As shown in the figure, TX has twice peel strength as high as PVDF, indicating better adhesive properties than PVDF.

EXAMPLE 1

1. Preparation of a Test Electrode

The mass ratio of graphite to a conductive agent to a total mass of the terpene resin and an additive of a terpene resin-based aqueous binder was 95:1:4. Graphite and the conductive agent were uniformly mixed, stirred and dispersed to yield a first mixture. The additive was added to deionized water to yield an aqueous solution, which was added to the first mixture and uniformly stirred to yield a second mixture. Thereafter, the terpene resin emulsion was mixed with the second mixture (TX/CMC=3/2), followed by the addition of appropriate deionized water and uniformly stirring, to yield an electrode slurry (with a solid content of 45%). The electrode slurry was coated on a Cu foil and fully dried under vacuum at 90° C., to yield an anode plate of lithium ion batteries. The anode plate was cut, weighed, and then installed in a No. 2025 battery case in a glove box, with a lithium plate as a counter electrode, polyethylene membrane as a separator, 1 M $LiPF_6$ EC/DMC/DEC (v/v/v=1/1/1) as an electrolyte, a battery was assembled and performed with a galvanostatic charge-discharge test.

2. Preparation of a Comparison Electrode

Employ SBR/CMC as a binder and follow the above method to prepare a comparison electrode.

3. Electrochemical Test

The charge-discharge cycle stability of the test electrode and the comparison electrode are measured.

4. Results and Analysis

Figure 1:
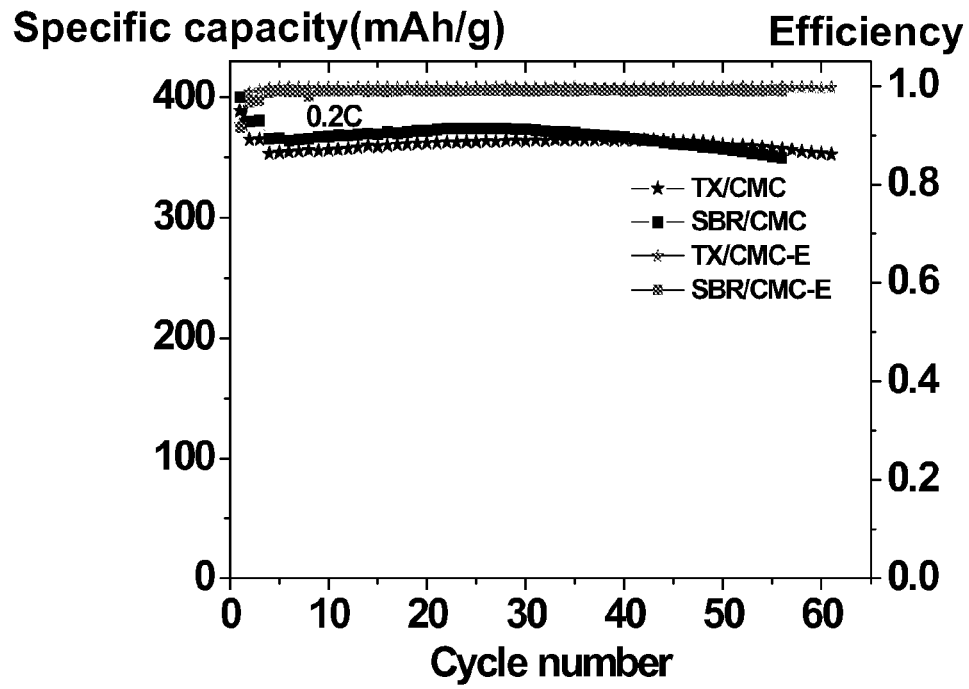
FIG. 1 shows cycle performance curves of a graphite electrode and a comparison electrode in Example 1 at the charge-discharge current density of 0.2 C.

FIG. 1 shows the cycle performance curves of the test electrode and the comparison electrode at the charge-discharge current density of 0.2 C, and Table. 2 shows the corresponding specific capacity and initial charge-discharge efficiency. As shown in the table, the initial efficiency of the graphite electrode with TX/CMC as binder is 92.2%, which is higher than the initial efficiency (91.5%) of the graphite electrode with SBR/CMC with binder. In addition, after 50 cycles, the specific capacity of the graphite electrode with TX/CMC as a binder has almost no decrease, while the specific capacity of the graphite electrode with SBR/CMC as binder decreases greatly.

TABLE 2

Initial charge-discharge efficiency of graphite electrodes prepared with different binders

| Binder | Initial charge-discharge efficiency of graphite electrode |
|---|---|
| TX/CMC | 92.2 |
| SBR/CMC | 91.5% |

EXAMPLE 2

1. Preparation of a Test Electrode

The example is basically the same as that in Example 1 except that the test electrode adopts TX/CMC as a binder, and TX/CMC=4:1.

2. Preparation of a Comparison Electrode

The same as that in Example 1.

3. Electrochemical Test

The charge-discharge cycle stability and rate performance of the test electrode and the comparison electrode are measured.

4. Results and Analysis

Figure 2:
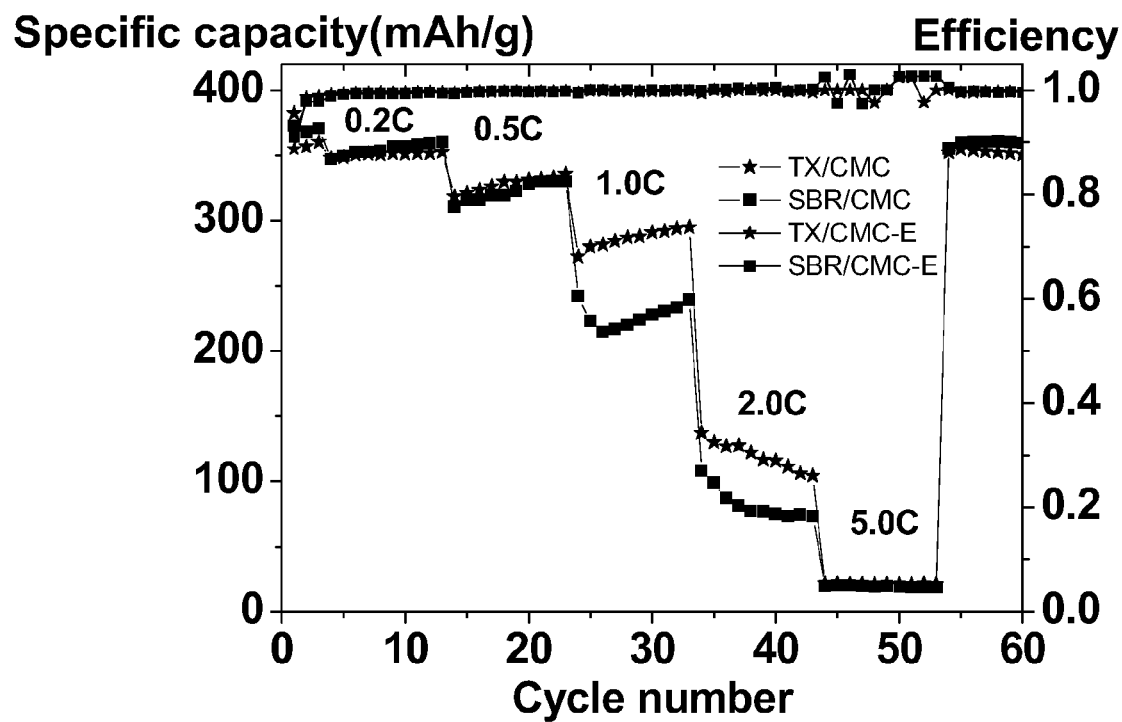
FIG. 2 shows cycle performance curves of a graphite electrode and a comparison electrode in Example 2 at different charge-discharge current densities.

FIG. 2 shows the cycle performance curves of the test electrode and the comparison electrode at different charge-discharge current densities. As shown in the figure, the graphite electrode with TX/CMC as binder exhibits good high rate performance. When the rate is higher than 0.5 C, the performance of the graphite electrode with TX/CMC as binder is far higher than that with SBR/CMC as a binder. When the rate is 1 C, the specific capacity of the graphite electrode with TX/CMC as a binder is 339 mAh/g, which is significantly higher than that of the graphite electrode with SBR/CMC as a binder (329 mAh/g).

EXAMPLE 3

1. Preparation of a Test Electrode

The example is basically the same as that in Example 1 except that the test electrode adopts TX/CMC as a binder, and TX/CMC=100:1.

2. Preparation of a Comparison Electrode

The same as that in Example 1.

3. Electrochemical Test

After three charge-discharge cycles, the impedance of the test electrode and the comparison electrode was measured.

4. Results and Analysis

Figure 3:
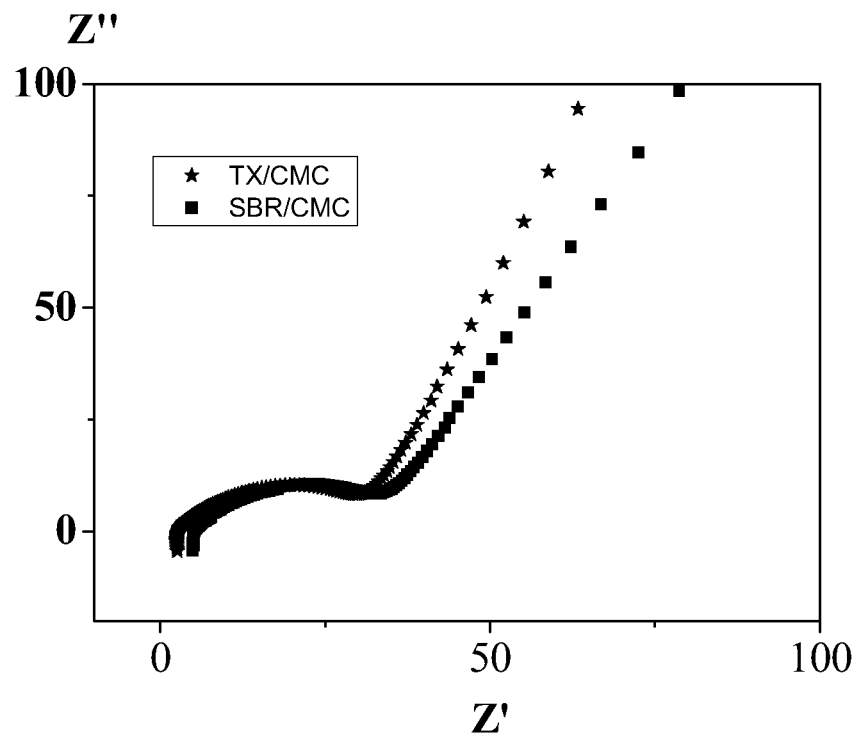
FIG. 3 shows impedance test results of a graphite electrode and a comparison electrode in Example 3 at the rate of 0.2 C.

FIG. 3 shows the impedance test results of the test electrode and the comparison electrode with TX/CMC and SBR/CMC as binders, respectively, at the rate of 0.2 C after three charge-discharge cycles. The results show that, the impedance of the graphite electrode with TX/CMC as a binder is relatively smaller than that of the graphite electrode with SBR/CMC as a binder.

EXAMPLE 4

1. Preparation of a Test Electrode

The example is basically the same as that in Example 1 except that the test electrode adopts TX/CMC as a binder, and TX/CMC=1:100.

2. Preparation of a Comparison Electrode

The same as that in Example 1.

3. Electrochemical Test

After five charge-discharge cycles, the impedance of the test electrode and the comparison electrode was measured.

4. Results and Analysis

Figure 4:
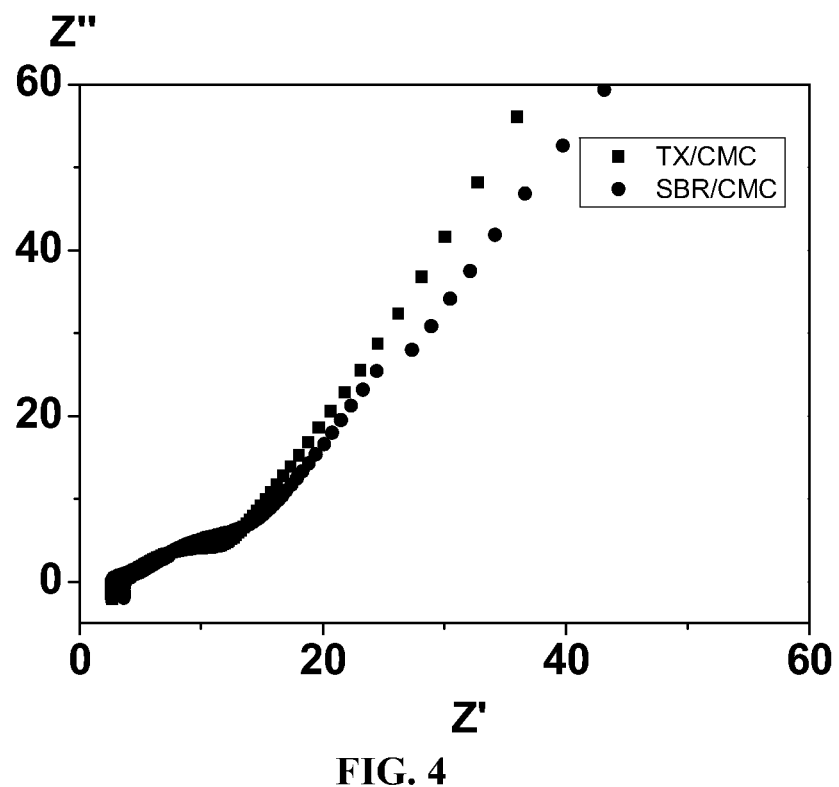
FIG. 4 shows impedance test results of a graphite electrode and a comparison electrode in Example 4 at the rate of 1 C.

FIG. 4 shows the impedance test results of the test electrode and the comparison electrode with TX/CMC and SBR/CMC as binders, respectively, at the rate of 1 C after five charge-discharge cycles. The results show that, the impedance of the graphite electrode with TX/CMC as a binder is relatively smaller than that of the graphite electrode with SBR/CMC as a binder.

EXAMPLE 5

1. Preparation of a Test Electrode

The test electrode also adopted the terpene resin emulsion as a binder, and silicon (Si) as an active material. The mass ratio of silicon to a conductive agent to a total mass of the terpene resin and carboxymethyl cellulose of a terpene resin-based aqueous binder was 70:20:10. Silicon and the conductive agent were uniformly mixed, stirred and dispersed to yield a first mixture. Carboxymethyl cellulose was added to deionized water to yield an aqueous solution, which was added to the first mixture and uniformly stirred to yield a second mixture. Thereafter, the terpene resin emulsion was mixed with the second mixture (TX/CMC=3/2), followed by the addition of appropriate deionized water and uniformly stirring, to yield an electrode slurry (with a solid content of 30%). The electrode slurry was coated on a Cu foil and fully dried, to yield a silicon anode plate. The anode plate was cut, weighed, and then installed in a No. 2025 battery case in a glove box, with a lithium plate as a counter electrode, polyethylene membrane as a separator, 1 M LiPF$_6$ EC/DMC/DEC (v/v/v=1/1/1) as an electrolyte, a battery was assembled and performed with a galvanostatic charge-discharge test.

3. Electrochemical Test

The charge-discharge cycle stability of the test electrode was measured.

4. Results and Analysis

Figure 5:
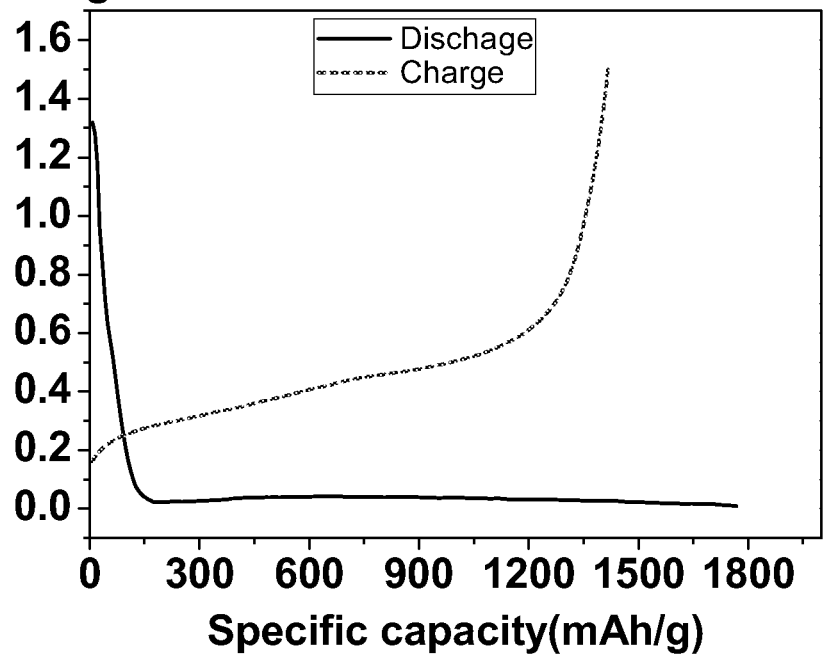
FIG. 5 shows an initial charge-discharge curve of a silicon electrode in Example 5 at the charge-discharge current density of 0.1 C.

FIG. 5 shows the initial charge-discharge curve of the silicon electrode at the charge-discharge current density of 0.1 C, the initial efficiency is 80%, and the initial specific capacity is 1800 mAh/g.

EXAMPLE 6

1. Preparation of a Test Electrode

The test electrode also adopted the terpene resin emulsion as a binder, and lithium titanate (LTO) as an active material. The mass ratio of lithium titanate to a conductive agent to a total mass of the terpene resin and carboxymethyl cellulose of a terpene resin-based aqueous binder was 80:10:10. Lithium titanate and the conductive agent were uniformly mixed, stirred and dispersed to yield a first mixture. Carboxymethyl cellulose was added to deionized water to yield an aqueous solution, which was added to the first mixture and uniformly stirred to yield a second mixture. Thereafter, the terpene resin emulsion was mixed with the second mixture (TX/CMC=3/2), followed by the addition of appropriate deionized water and uniformly stirring, to yield an electrode slurry (with a solid content of 40%). The electrode slurry was coated on an Al foil and fully dried, to yield a lithium titanate anode plate. The anode plate was cut, weighed, and then installed in a No. 2025 battery case in a glove box, with a lithium plate as a counter electrode, polyethylene membrane as a separator, 1 M $LiPF_6$ EC/DMC/DEC (v/v/v=1/1/1) as an electrolyte, a battery was assembled and performed with a galvanostatic charge-discharge test.

3. Electrochemical Test

The charge-discharge cycle stability of the test electrode was measured.

4. Results and Analysis

Figure 6:
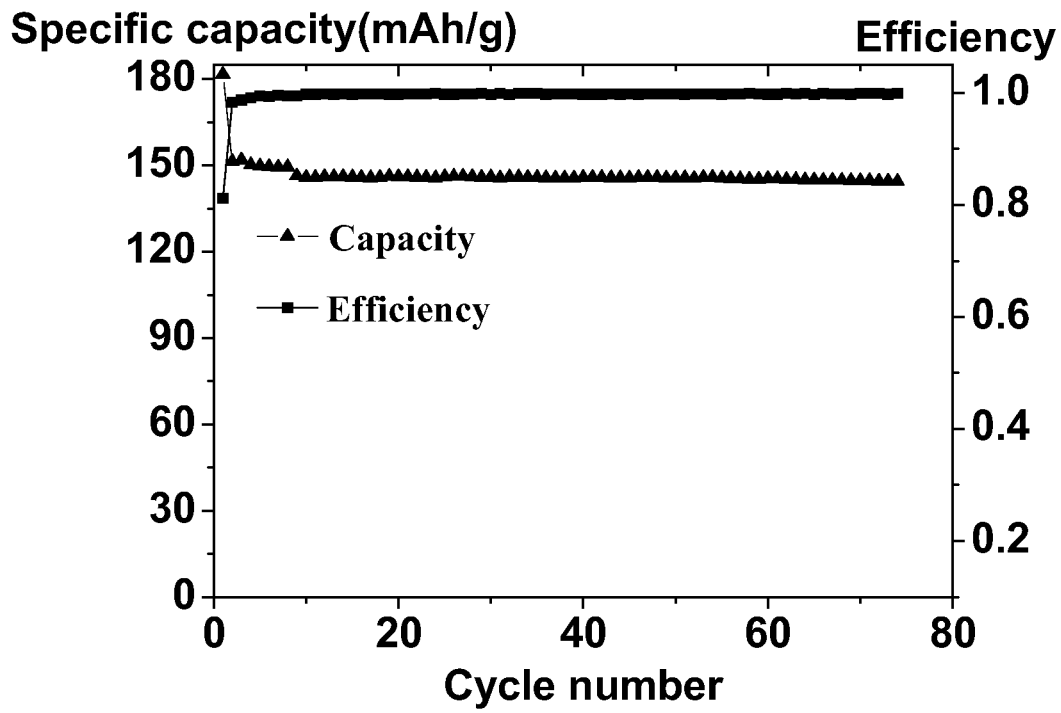
FIG. 6 shows a cycle performance curve of a lithium titanate electrode in Example 6 at the charge-discharge rate of 0.5 C.

FIG. 6 shows the cycle stability of the lithium titanate electrode at the charge-discharge rate of 0.5 C. The initial efficiency is 84%, and after 60 cycles, the specific capacity retention percentage reaches 99%.

EXAMPLE 7

1. Preparation of a Test Electrode

The test electrode also adopted the terpene resin emulsion as a binder, and activated carbon (C) as an active material. The mass ratio of activated carbon to a conductive agent to a total mass of the terpene resin and carboxymethyl cellulose of a terpene resin-based aqueous binder was 85:10:5. Activated carbon and the conductive agent were uniformly mixed, stirred and dispersed to yield a first mixture. Carboxymethyl cellulose was added to deionized water to yield an aqueous solution, which was added to the first mixture and uniformly stirred to yield a second mixture. Thereafter, the terpene resin emulsion was mixed with the second mixture (TX/CMC=3/2), followed by the addition of appropriate deionized water and uniformly stirring, to yield an electrode slurry (with a solid content of 40%). The electrode slurry was coated on an Al foil and fully dried, to yield an activated carbon anode plate. The anode plate was cut, weighed, and installed in a button cell case along with a separator, followed by dropwise addition of an electrolyte and sealing, whereby yielding a symmetrical activated carbon supercapacitor. The cycle stability of the supercapacitor was tested.

3. Electrochemical Test

The charge-discharge cycle stability of the test electrode was measured at the current density of 200 mA/g.

4. Results and Analysis

Figure 7:
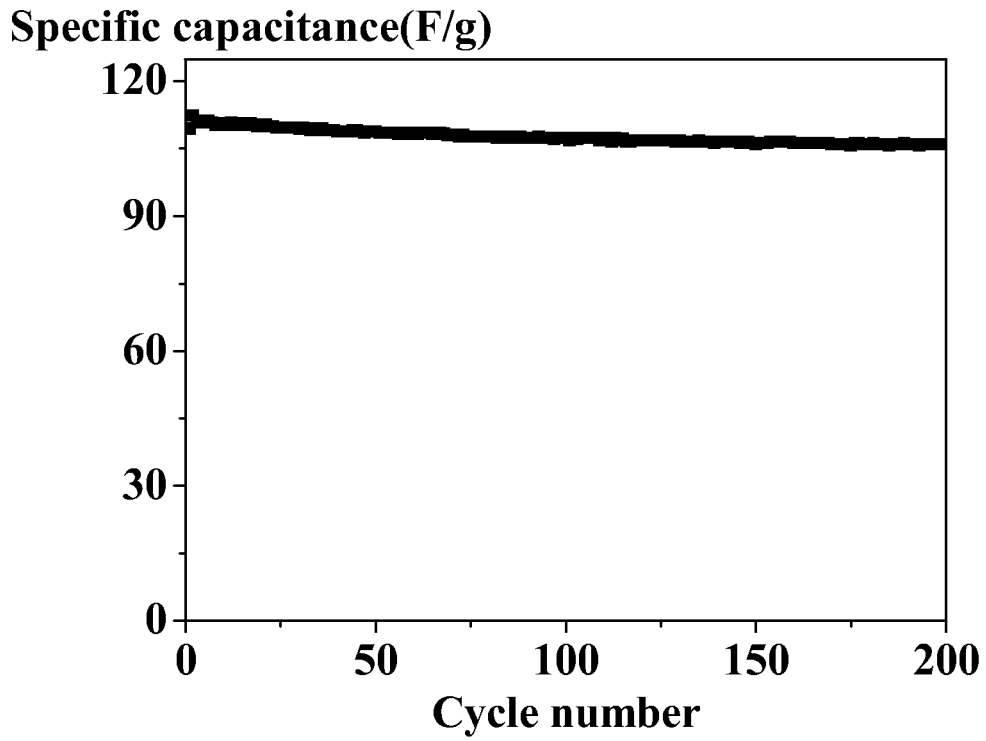
FIG. 7 shows a cycle stability curve of an activated carbon supercapacitor in Example 7 at the charge-discharge current density of 200 mA/g.

FIG. 7 shows the cycle stability curve of the activated carbon supercapacitor with TX/CMC as a binder at the charge-discharge current density of 200 mA/g and a voltage of 0-2.5 V. The initial specific capacitance is 110 F/g, and after 200 cycles, the specific capacity retention percentage reaches 96.9%, which means, the supercapacitor has good cycle stability.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparing an anode of lithium ion batteries or an electrode plate of a supercapacitor, the anode or the electrode plate comprising a terpene resin-based aqueous binder, an active material, and a conductive agent; wherein:

the terpene resin-based aqueous binder comprises an additive and a terpene resin emulsion comprising between 20 wt. % and 80 wt. % of a terpene resin, the terpene resin emulsion has a viscosity of between 2000 mPa·s and 10000 mPa·s; and a mass ratio of the active material to the conductive agent to a total mass of the terpene resin and the additive is 70-95: 1-20: 4-10;

the method comprising:

1) uniformly mixing, stirring and dispersing the active material and the conductive agent to yield a first mixture;

2) adding the additive to deionized water to yield an aqueous solution, and adding the aqueous solution to the first mixture obtained in 1) and uniformly stirring, to yield a second mixture;

3) adding the terpene resin emulsion to the second mixture obtained in 2), and adding deionized water and uniformly stirring, to yield an electrode slurry; and 4) coating the electrode slurry obtained in 3) on a Cu foil or an Al foil, fully drying, to yield the anode of lithium ion batteries or the electrode plate of a supercapacitor.

2. The method of claim 1, wherein a solid content of the electrode slurry obtained in 3) is between 30% and 45%, and a viscosity thereof is between 2500 mPa·s and 4000 mPa·s.

3. The method of claim 1, wherein the coated Cu foil or Al foil is dried under vacuum for between 24 hours and 48 hours at a constant temperature of between 80° C. and 90° C.

4. The method of claim 1, wherein the active material is graphite, activated carbon, silicon, or lithium titanate, and the conductive agent is a carbonaceous conducting material selected from the group consisting of acetylene black, super P, vapor-grown carbon fiber (VGCF), and carbon nanotubes (CNTs).

5. The method of claim 1, wherein the additive is carboxylated cellulose or a salt thereof.

6. The method of claim 1, wherein the additive is carboxymethyl cellulose.

\* \* \* \* \*